Figures 1, 2:
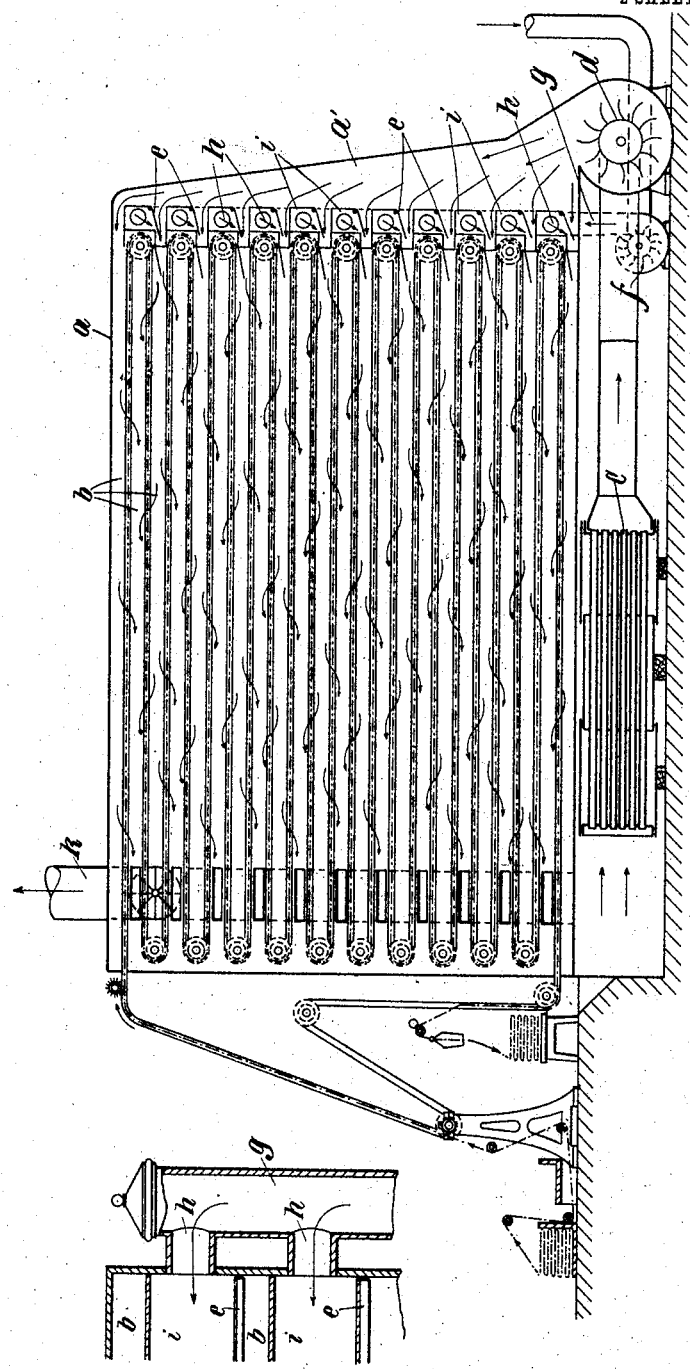

No. 781,145. PATENTED JAN. 31, 1905.
M. R. JAHR.
APPARATUS FOR DRYING WOVEN GOODS.
APPLICATION FILED JULY 11, 1904.

2 SHEETS—SHEET 1.

Witnesses
Geo. Heinicke
F. Dittmar

Inventor
Moritz Rudolf Jahr
by F. Dittmar
Attorney

No. 781,145. PATENTED JAN. 31, 1905.
M. R. JAHR.
APPARATUS FOR DRYING WOVEN GOODS.
APPLICATION FILED JULY 11, 1904.
2 SHEETS—SHEET 2.
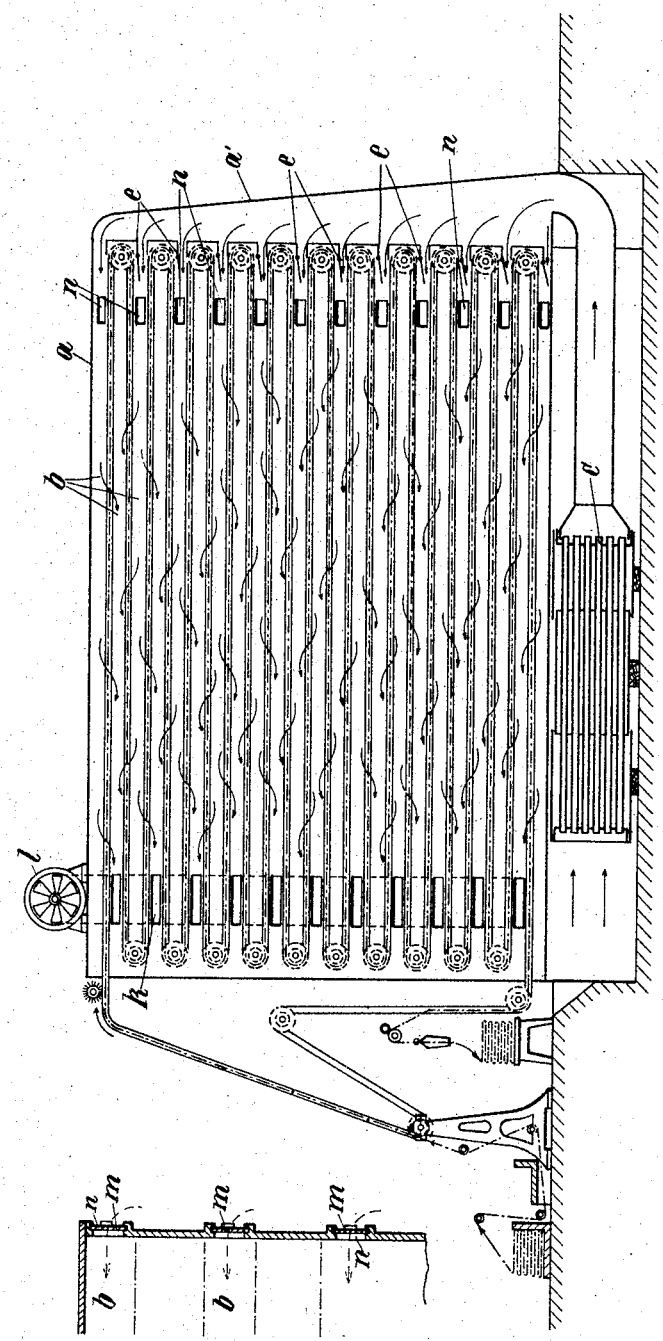

No. 781,145. Patented January 31, 1905.

UNITED STATES PATENT OFFICE.

MORITZ RUDOLF JAHR, OF GERA, GERMANY.

APPARATUS FOR DRYING WOVEN GOODS.

SPECIFICATION forming part of Letters Patent No. 781,145, dated January 31, 1905.

Application filed July 11, 1904. Serial No. 216,068.

*To all whom it may concern:*

Be it known that I, MORITZ RUDOLF JAHR, a subject of the Emperor of Germany, residing at Gera, Reuss, Germany, have invented certain new and useful Improvements in Methods of and Apparatus for the Drying of Woven Goods or the Like, of which the following is a full, clear, and exact specification.

Hitherto methods and apparatus for drying woven goods and the like generally had the disadvantage that the woven goods from the beginning to the end were subjected to the influence of dry heat uniformly high, whereby the "touch" and smoothness of the material is very much impaired, while at the same time this dry hot air has an injurious effect on dyed material and sometimes also gives it a faded appearance. These disadvantages are avoided according to the present invention, which consists of a method and apparatus for the drying of woven goods and the like wherein the woven goods are led through passages lying one above the other and through which the dry air passes in such a manner that the goods at their entrance into the drying-machine are at once subjected to the action of dry air of very high temperature, which is reduced till in the last stage it is lowered to the ordinary temperature. This is effected by the hot air entering the channel at the bottom of the drying-machine passing through movable flaps in certain volumes into the channels, where its temperature is regulated by means of fresh air and brought to the desired degree. The volume of fresh air which enters and regulates the heat is also adjusted by means of flaps or slides.

The most suitable arrangement for carrying out the new method consists in the provision of tiers of passages in the drying-machine with two fans or ventilators, one of which forces in the hot air and the other the fresh air. In this arrangement the hot air enters the separate passages of the machine through flaps, which are connected together and can be exactly arranged to admit the desired volume of air, while the connection between the fan forcing in the fresh air and the machine is made by means of a branch pipe whose separate branches conduct the air into chambers, and thereby allow that the admission of the fresh air to the passages is regulated by the same flaps and that the fresh air before entering into the separate passages is mixed with hot air.

The carrying out of the invention can, however, be effected in another way, in which an exhauster takes the place of the two fans or ventilators, one exhauster being arranged within or above the upper part of the drying-machine and exhausting the separate passages, the hot air flowing in through flaps. At the same time this exhauster causes fresh air to flow through slides arranged in the sides of the drying-machine into the separate drying-passages of the machine.

By this invention the most favorable conditions for a good drying method have been attained, so that the woven material can be subjected to heat at the temperature which is most suitable, according to its moisture contained in it, and, further, as the moisture is reduced the material is exposed to a corresponding lower temperature, so that it does not become unduly dry. This prevents the material from fading and also prevents the textile fibers from breaking or rotting. This method would therefore be used with great advantage for bleached or limed goods. As compared with cold-air drying-machines the new one possesses a considerably higher efficiency, as the drying of the material goes on much more quickly than in the cold-air drying-machine, while the new machine has the further advantages that since it has means for adjusting the temperature to correspond with the amount of moisture neither the color of the material nor its natural content of moisture is affected.

The new drying method also is in no way inferior to that of drying in fresh air, because the temperature of the dry air in the upper passages can be as high as 100° centigrade, while in the lowest it might only be 20° centigrade or less.

The accompanying drawings serve to more clearly explain the new method and show the necessary apparatus for carrying it into effect.

Figure 1 shows a drying-machine in longitudinal section and shows particularly the use of the new method with two fans. Fig. 2 shows the connection between the pipe from the fresh-air fan and the separate drying-channels of the drying-machine. Fig. 3 shows the arrangement in which the two fans are replaced by an exhausting-fan and in which the admission of fresh air is effected by openings regulated by slides. Fig. 4 shows a transverse section of Fig. 3.

$a$ is the drying-machine, with the channels $b$ for the woven material passing through the machine and lying one above the other. Under the machine is arranged the heater $c$, which produces the hot air. The hot air is forced in by a fan $d$, Fig. 1, to pass into the vertical channel $a'$ of the machine and is admitted into the separate passages through the flaps $e$, which are connected together. The second fan, $f$, forces fresh air into the machine and is connected with it by a branch pipe $g$, Fig. 2, whose branches $h$ lead into the separate passages, which are provided with chambers $i$. These chambers allow the admission of the fresh air to be regulated by the flap $e$, through which the hot air enters, so that the fresh air is well mixed with the hot air before entering the channel and, further, allow a uniform admission of air from the beginning. After the passage of the air through the machine it escapes through the exhaust-pipe $k$.

In the arrangement shown in Fig. 3 an exhauster $l$ takes the place of the two fans. This exhauster, which is preferably arranged in or above the upper part of the drying-machine, sucks into the machine air heated by the heater and causes it to pass through the flaps $e$ into the channels and thence outside. In this case the admission of fresh air is also effected by the exhauster. For this purpose openings $n$, which can be regulated by slides $m$, are arranged in the wall of the drying-machine, Fig. 4.

Since all the flaps $e$ are connected together, the temperature in the separate drying-passages can be regulated as desired, according to the moisture contained in the material.

The channel $a'$ and the inlet-flaps $e$ can also be arranged on the opposite side, so that the air enters into the drying-passages on this side and passes through the drying-machine from the front to the back.

Having now particularly described and ascertained the nature of my said invention and in what manner the same is to be performed, I declare that what I claim is—

1. Apparatus for drying fabrics woven goods and the like, composed of a box having a number of superposed channels adapted for a continuous passage of fabrics, of a heater under said box of a ventilator adapted to lead hot air from the heater into said passages, and of means to introduce cold air commingling with the hot air.

2. Apparatus for drying fabrics, woven goods, and the like, composed of a box having a number of superposed channels adapted for a continuous passage of fabrics, of a heater under said box of a ventilator adapted to lead hot air from the heater into said passages, and of a second ventilator, taking fresh air from the atmosphere, and driving it into the said passages to commingle with the hot air and thereby regulating its temperature.

3. Apparatus for drying fabrics, woven goods and the like, composed of a box having a number of superposed channels adapted for a continuous passage of fabrics, of a heater under said box of a ventilator adapted to lead hot air from the heater into said passages, and of a second ventilator taking fresh air from the atmosphere and driving it into said passages to commingle with the hot air and thereby regulating its temperature, in combination with adjustable flaps at the end of the passages, said flaps being provided with means to open them more or less, so that air of a higher temperature may come in contact with the goods upon entering the machine and that air of a lower temperature may be in contact with the goods when leaving the machine.

4. Apparatus for drying fabrics, woven goods and the like composed of a box having a number of superposed channels adapted for a continuous passage of fabrics, of a heater under said box, of a ventilator adapted to lead hot air from the heater into said passages, and of suitable openings allowing cold air from the atmosphere to enter the passages and to commingle with the hot air.

In testimony whereof I affix my signature.

MORITZ RUDOLF JAHR.

In presence of—
J. STEPHAN,
SOUTHARD P. WARNER.